United States Patent
Riley

[15] 3,696,760
[45] Oct. 10, 1972

[54] LEARNING TABLE
[72] Inventor: Jefferson B. Riley, 1545 Chapel Street, New Haven, Conn. 06511
[22] Filed: Sept. 10, 1970
[21] Appl. No.: 71,145

[52] U.S. Cl. .................................. 108/32, 312/239
[51] Int. Cl. ............................................. A47b 41/04
[58] Field of Search ........................... 108/31–35, 50, 108/60, 61; 312/140.1, 239, 196; 297/157

[56] References Cited

UNITED STATES PATENTS

| | | | |
|---|---|---|---|
| 3,477,760 | 11/1969 | Bue et al. | 297/157 |
| 744,888 | 11/1903 | Widman et al. | 108/32 |
| 2,931,685 | 4/1960 | Butler | 312/196 |
| 1,364,289 | 1/1921 | Low et al. | 108/32 X |
| 2,051,490 | 8/1936 | Lightfoot | 108/32 |
| 2,129,384 | 9/1938 | Ralston | 108/32 |
| 2,542,662 | 2/1951 | Golenjaul | 108/32 |
| 3,464,372 | 9/1969 | Fiterman et al. | 108/60 |

Primary Examiner—Bobby R. Gay
Assistant Examiner—Glenn O. Finch
Attorney—Delio & Montgomery

[57] ABSTRACT

A modular classroom table for cooperating in the promotion of a formal and an informal learning environment, comprising a plurality of inclined desk surfaces disposed along a first edge of a horizontal top panel, which desk surfaces may be independently raised or lowered to fit the individual student. Another edge of the top panel is provided with a plurality of cutouts which, when complementing cutouts of one or more of other cutouts of the tables in modular arrangements, define geometrical figures such as circles and semi-circles.

10 Claims, 9 Drawing Figures

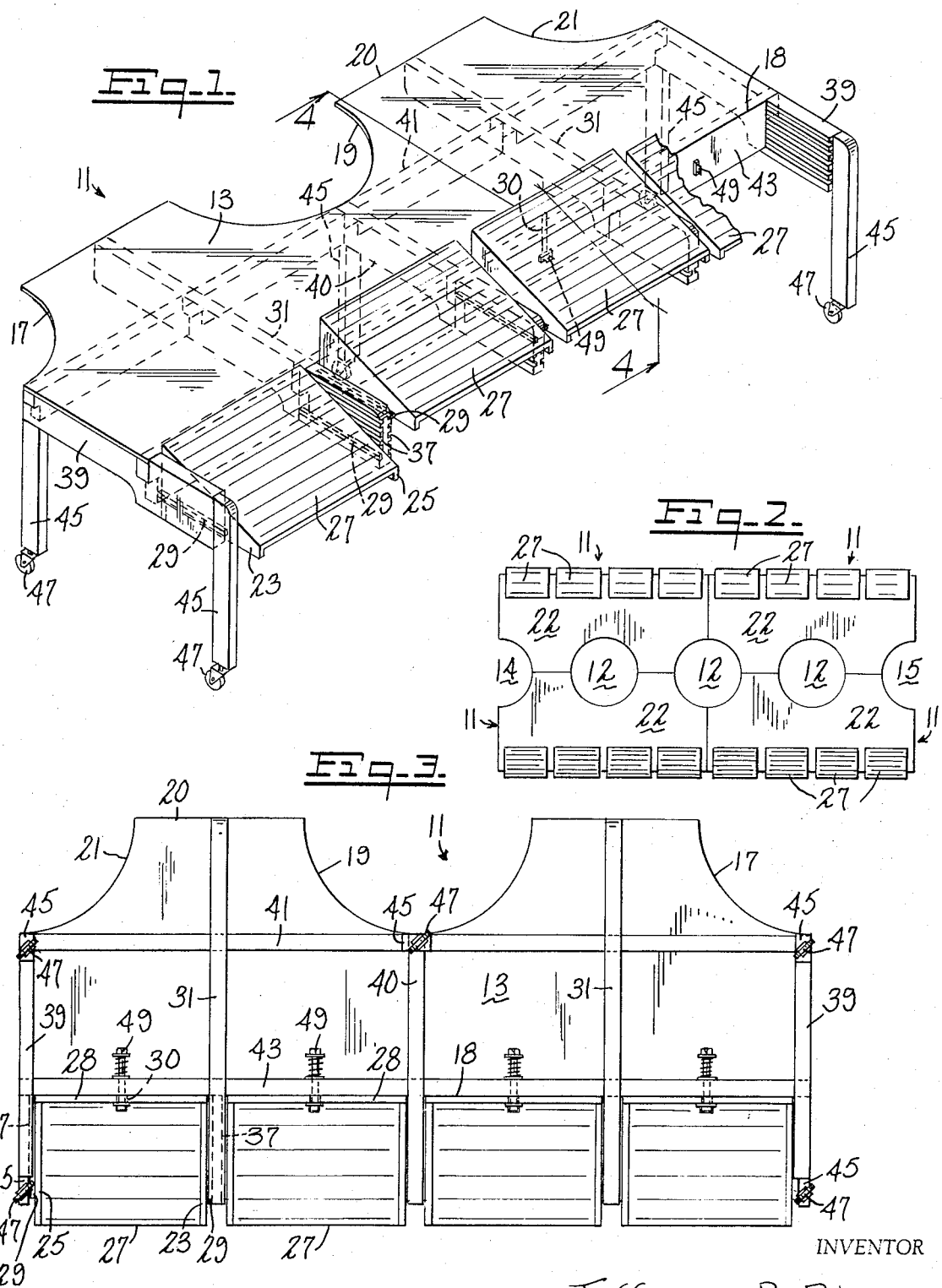

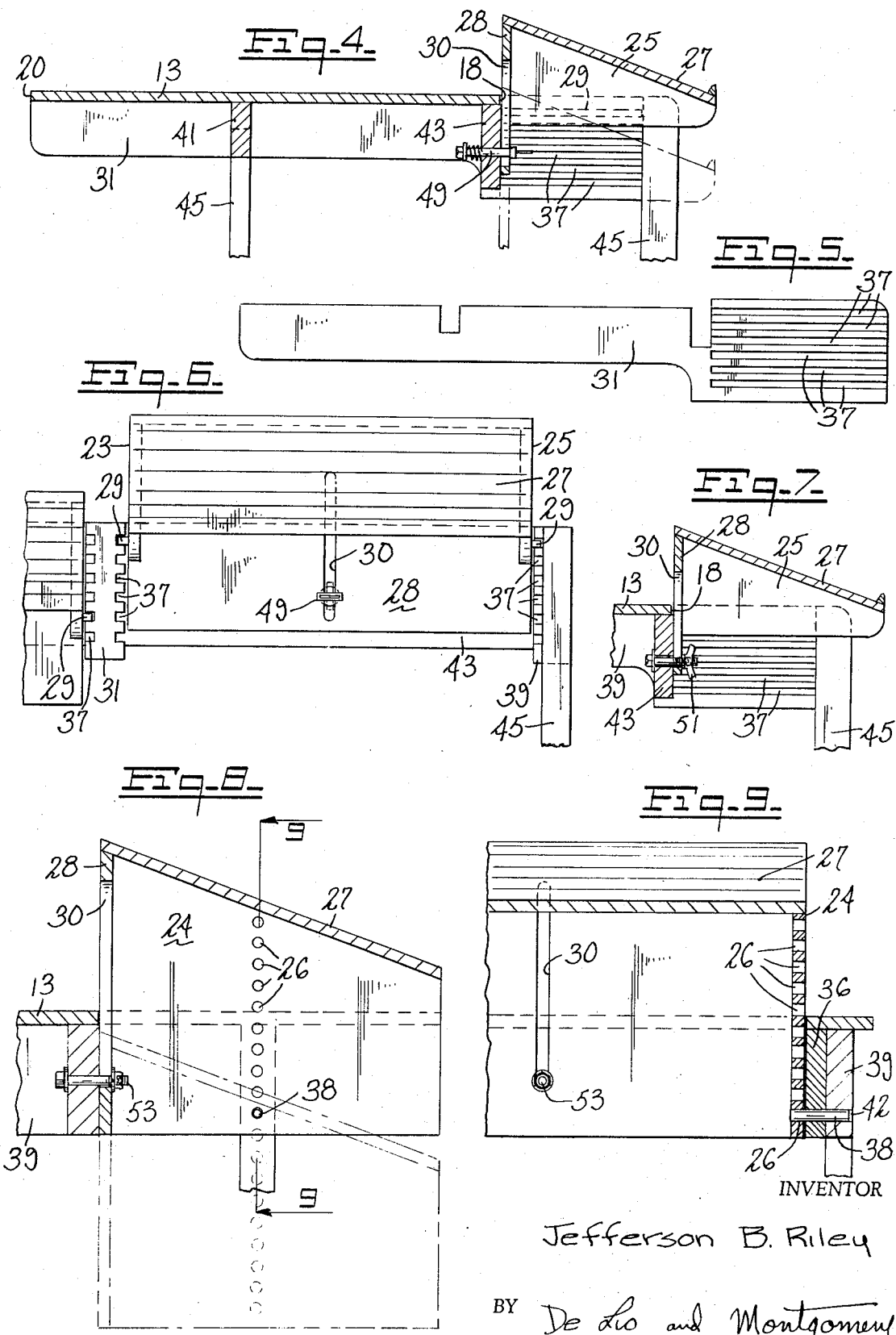

LEARNING TABLE

BACKGROUND OF THE INVENTION

This invention relates to classroom tables, more particularly to classroom tables which cooperate with the teacher and the classroom environment in the learning process. Because of this function, the tables of the invention may be described as "learning tables."

Classroom tables and desks are generally regarded as static equipment in the usual teaching situation, that is, equipment which is provided only as furniture to facilitate formal learning, as in the practice of reading and writing, and in lecturing. While a variety of designs have been provided for purposes of adjustability of desk surface heights and for improvement of posture control, these being important requisites for learning, very little attention has been given to design of classroom tables for further cooperation and participation in the learning process.

The physical environment of the classroom is especially important for very young children, for example, between the ages of 3 years and 8 years, due to the short attention span and the inability to assimilate abstractions at these ages. Partly for these reasons, classrooms at the preschool, kindergarten, and the lower grade levels have been equipped with perceptual training devices including equipment for play and other equipment inherently useful in developing the ability to learn and the desire to learn.

For use as learning tools, such tables should also facilitate individual as well as group activity, and should permit a wide choice of arrangement in the classroom.

Nevertheless, very little attention has been given to the design of classroom tables which effectively combine in a single unit the foregoing attributes, for participation in the total learning process, involving individual activity, group activity, and interplay between the student, the teacher and the classroom environment.

SUMMARY OF THE INVENTION

Accordingly, an object of the invention is to provide a new and improved classroom table useful for formal learning activity, as in the teaching of reading, writing and formal subjects, but which is also useful as an object or tool for informal learning activity, as in a perceptual training program, problem solving, or imaginative play activity.

Another object is to provide new and improved classroom table modules, the modular character of which not only facilitates the saving of space but also permits various arrangements defining geometrical figures and architectural forms, these arrangements being useful in informal learning activity.

A still further object of the invention is to provide new and improved classroom tables, the work surfaces of which are slanted to facilitate reading and writing and adjustable to fit the height of the individual student, which classroom tables individually may accommodate a small group of students but without substantially impeding an individual child's normal physical movement while seated at the table.

An additional object is to provide new and improved classroom tables which may be moved easily about the classroom and may be easily and economically constructed.

Still other objects, features and advantages of the invention will in part be obvious and will in part be apparent from the specification which follows.

The invention accordingly comprises an article of manufacture possessing the features, properties and the relationship of elements which will be exemplified in the article hereinafter described, and the scope of the invention will be indicated in the claims.

In brief summary, the classroom table of the invention is characterized by a plurality of inclined desk surfaces disposed along a first edge of the top panel of the tables, a plurality of cutouts along a second edge of the top panels, which cutouts complement cutouts of at least one other of the tables to define geometrical figures, and means for independently adjusting the heights of each of the desk surfaces.

DETAILED DESCRIPTION

For a fuller understanding of the nature and objects of the invention, reference is had to the following description taken in connection with the accompanying drawings, in which:

FIG. 1 is a top perspective view, with one portion partially fragmentary, of one embodiment of a classroom table of the invention;

FIG. 2 is a top plan view of an arrangement of four classroom tables of the invention;

FIG. 3 is a plan view from beneath a classroom table of the invention;

FIG. 4 is a partially fragmentary section along the line 4—4 of FIG. 1;

FIG. 5 is a side elevation of a central strut of a table of FIG. 1;

FIG. 6 is a front elevational view of an end portion of a classroom table of the invention, showing a desk surface;

FIG. 7 is a portion of the strut of FIG. 4, showing alternate means for locking engagement;

FIG. 8 is a side elevation, partially in fragment, of another embodiment of a classroom table of the invention, showing alternate means for height adjustment of a desk surface and for locking engagement; and FIG. 9 is a section along the line 9—9 of FIG. 8.

Turning first to FIGS. 1 and 3, a classroom table 11 of the invention comprises a surface member or horizontal top panel 13 supported on the underside by a pair of first ribs or struts 41 and 43 arranged substantially parallel to a first edge 18 of the top panel 13. The second, opposite edge 20 of top panel 13 is provided with cutouts 17, 19 and 21, shown as quarter circles and as a semi-circle. The cutouts may be greater or lesser in number and may have the form of other segments of geometrical figures, such as rectangles, triangles, stars, or other polygons.

Mounted transversely of struts 41 and 43 are end struts 39, center strut 40 and intermediate struts 31. As evident from the sections of FIGS. 4 and 5, the struts 31 are provided with cutouts 33 and 35 for engagement with similar cutouts in struts 41 and 43. End struts 39 are provided with legs 45 and casters 47 and center strut 40 is similarly provided with a single leg and caster for easy moving of the tables in the classroom. The absence of a leg intermediate the ends of first edge 18 provides ample space for movement of students' feet beneath the table.

Mounted along edge 18 are desk surfaces 27 each having side panels 23 and 25 and a pair of ledges or glide members 29 mounted one on each of side panels 23 and 25. Glide members 29 provide sliding engagement with selected pairs of grooves 37 in struts 31, 39 and 40. Two such positions of height are shown in FIG. 4, an upper position (solid lines) and a lower position (discontinuous lines). It will also be noted that desk surfaces 27 are upwardly inclined to facilitate use of the surfaces for reading and writing. Preferably, the angle of inclination from the horizontal is from about 15° to about 25°, the optimum being about 20°. The angle of inclination may be adjustable but it is preferred to construct the desk surfaces with a fixed angle of inclination to avoid tilting during use or distraction to the student. It will be noted that the desk surfaces 27 are independently adjustable as to height in order to accommodate students of different stature.

The learning tables of the invention as depicted in the drawings are provided with four desk surfaces each since it has been found that this number is preferred for maximum effectiveness of group activities and maximum utilization of the modular characteristics of the tables while retaining the simplicity and economy of construction.

FIGS. 3, 4 and 6 illustrate one form of means for locking the desk surfaces at selected heights. With reference particularly to FIGS. 4 and 6, a slot 30 is provided in an end panel 28 of a desk member for receiving a spring loaded wing bolt and nut combination 49 in which the nut is permanently tightened. After selection of the proper height of desk surface 27, the wing bolt is turned crosswise to bear against strut surface 43 to fix the desk surface 27 against movement. Alternatively, a wing nut and bolt combination 51 may be employed, as shown in FIG. 7, or a simple nut and bolt arrangement 53 as shown in FIGS. 8 and 9.

Another embodiment of a classroom table, particularly the height adjusting means, is illustrated in FIGS. 8 and 9. With reference thereto, a line of vertically disposed apertures 26 is provided in at least one of the side panels 24 of each of the desk members. End struts 39 are then provided with additional support members 36 through which is cut an aperture 42 for insertion of a peg 38. Desk surface 27 is then held at a selected height by insertion of pin or peg 38 into one of apertures 26. While it is possible to fix each desk member at the required height by a peg through only one side panel 24 of each desk member, it is preferred for better stability, to provide for height adjustment on each side of each desk member by similar apertures and cooperating pegs.

FIG. 2 illustrates the modular characteristics of the tables by a grouping of four tables of the invention. It will be noted that the classroom tables 11 are so grouped that wide working areas comprising the total of working surfaces 22 are provided together with the circular open spaces 12 and semi-circular areas 14 and 15. By reason of this arrangement, it will be noted that 16 students may be accommodated in a relatively small portion of the total space of a classroom. Moreover, while the arrangement facilitates group discussion, it also permits informal learning activities since the configurations 12, 14 and 15 provide opportunities for imaginative play-type activity as well as the learning of geometrical forms. For example, in a group of young children, the geometrical configurations together with the open areas beneath the arrangement of tables provide space for play activity in their suggestion of tunnels, castles, islands, and the like. If desired, each desk module may be painted a different color so as to enhance the learning and play qualities of the units.

Thus, by reason of the unique construction of the tables, it is now possible to integrate classroom tables into the modern concepts of total environment teaching while at the same time facilitate the saving of space and the variability of arrangement of desks in a classroom.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a modular classroom table for promoting both a formal and informal learning environment, the combination of:
    a horizontal top panel;
    a plurality of inclined desk surfaces disposed along a first edge of said top panel;
    said top panel having a plurality of cutouts along a second edge thereof, said cutouts complementing cutouts of at least one other of said tables to define geometrical figures;
    a plurality of first struts for supporting said top panel and disposed parallel to said first edge;
    a plurality of second struts for supporting said top panel and disposed transversely of said first struts; and
    means for independently adjusting the heights of each of said desk surfaces.

2. A classroom table of claim 1 wherein said cutouts define segments of a circle.

3. A classroom table of claim 1 having four of said inclined desk surfaces.

4. A classroom table of claim 1 wherein said desk surfaces are inclined at an angle of from about 15° to about 25° from the horizontal.

5. A classroom table of claim 1 wherein said height adjusting means includes glide members mounted on each side of said desk surfaces, for sliding engagement with selected grooves in said second struts.

6. A classroom table of claim 1 wherein said height adjusting means includes supporting side panels for said desk surfaces, a line of vertically disposed apertures in said side panels, and apertures in said second struts for insertion of a pin to lockingly engage selected apertures in said side panels.

7. A classroom table of claim 5 including means for locking engagement of said desk surfaces with one of said first struts at any selected height.

8. A classroom table of claim 6 including means for locking engagement of said desk surfaces with one of said first struts at any selected height.

9. A classroom table of claim 7 wherein said means for locking engagement comprises the combination of a spring-loaded bolt and nut.

10. A classroom table of claim 8 wherein said means for locking engagement comprises the combination of a spring-loaded bolt and nut.

* * * * *